FLOATING REFERENCE CLIPPING CIRCUIT

Filed Aug. 24, 1964 2 Sheets-Sheet 1

Sept. 26, 1967 G. B. THOMPSON 3,344,284

FLOATING REFERENCE CLIPPING CIRCUIT

Filed Aug. 24, 1964 2 Sheets-Sheet 2

United States Patent Office 3,344,284
Patented Sept. 26, 1967

3,344,284
FLOATING REFERENCE CLIPPING CIRCUIT

Gordon B. Thompson, Ottawa, Ontario, Canada, assignor to Northern Electric Company Limited, Montreal, Quebec, Canada Filed Aug. 24, 1964, Ser. No. 391,519
10 Claims. (Cl. 307—88.5)

This invention relates to a clipping circuit. More particularly it relates to a floating reference clipping circuit useful for removing those portions of an electrical signal that exceed a selected value with respect to a varying reference voltage inherent in the signal. The circuit is particularly useful in processing television signals to remove those portions of the signal that exceed, for example, the white level of the signal.

In the past, clipping circuits have generally required that the signal to be clipped contain an unvarying reference voltage. Such clipping circuits have commonly operated by algebraically adding a fixed voltage to this unvarying reference voltage and clipping those portions of the signal that exceed the value of the combined value of the fixed voltage and the reference voltage.

In the use of such prior art clipping circuits in, for example, the television field, the difficulty has been encountered that video signals available to the clipping circuits are generally AC coupled and have drift or 60 cycle hum or low frequency noise superimposed thereon In other words, such signals do not contain the unvarying reference voltage necessary for operation of the prior art clipping circuits. It therefore has been necessary to clamp the video signal (usually during the back porch interval) to establish the required unvarying reference level in the signal. Alternatively, the D.C. component of the signal may be restored, but effective D.C. restoration usually involves clamping circuits. Indiscriminate clamping of video signals is generally undesirable and to be avoided, particularly in the case of colour television, where the back porch is largely occupied by the colour burst.

Accordingly it is an object of the present invention to provide a floating reference clipping circuit that will remove portions of an electrical signal that exceed a selected value with respect to a varying reference voltage inherent in the signal (this reference voltage usually being either the positive or the negative envelope of the signal) without clamping the signal or restoring its direct current component. Put in slightly different language, it is an object of the invention to provide a circuit that will remove portions of a signal that exceed a selected peak to peak swing without clamping or D.C. restoring the signal.

To this end the invention in one of its aspects comprises input means for the signal and output means coupled to the input means. Diode means are coupled to the input means for disabling direct signal transmission between the input means and the output means under one bias condition (which will exist at times when the peak to peak swing of the signal exceeds the selected value) and for enabling such direct signal transmission under another bias condition (which will exist at all other times). Means are provided for generating a first voltage of the selected value (i.e. a voltage equal to the maximum peak to peak swing desired) and means are also provided for generating a second voltage equal to the varying reference voltage inherent in the signal (this second voltage usually being either the positive or the negative envelope of the signal). Further means are provided connecting the means for generating the first and second voltages, for generating a third voltage equal to the algebraic sum of the first and second voltages, and such further means are coupled to the diode means so that the diode is biased with such third voltage.

Other objects and advantages of the invention will appear from the following disclosure, in which the circuits illustrated are described by way of example only, the broad scope of the invention being limited only by the appended claims.

Figures 1, 2:
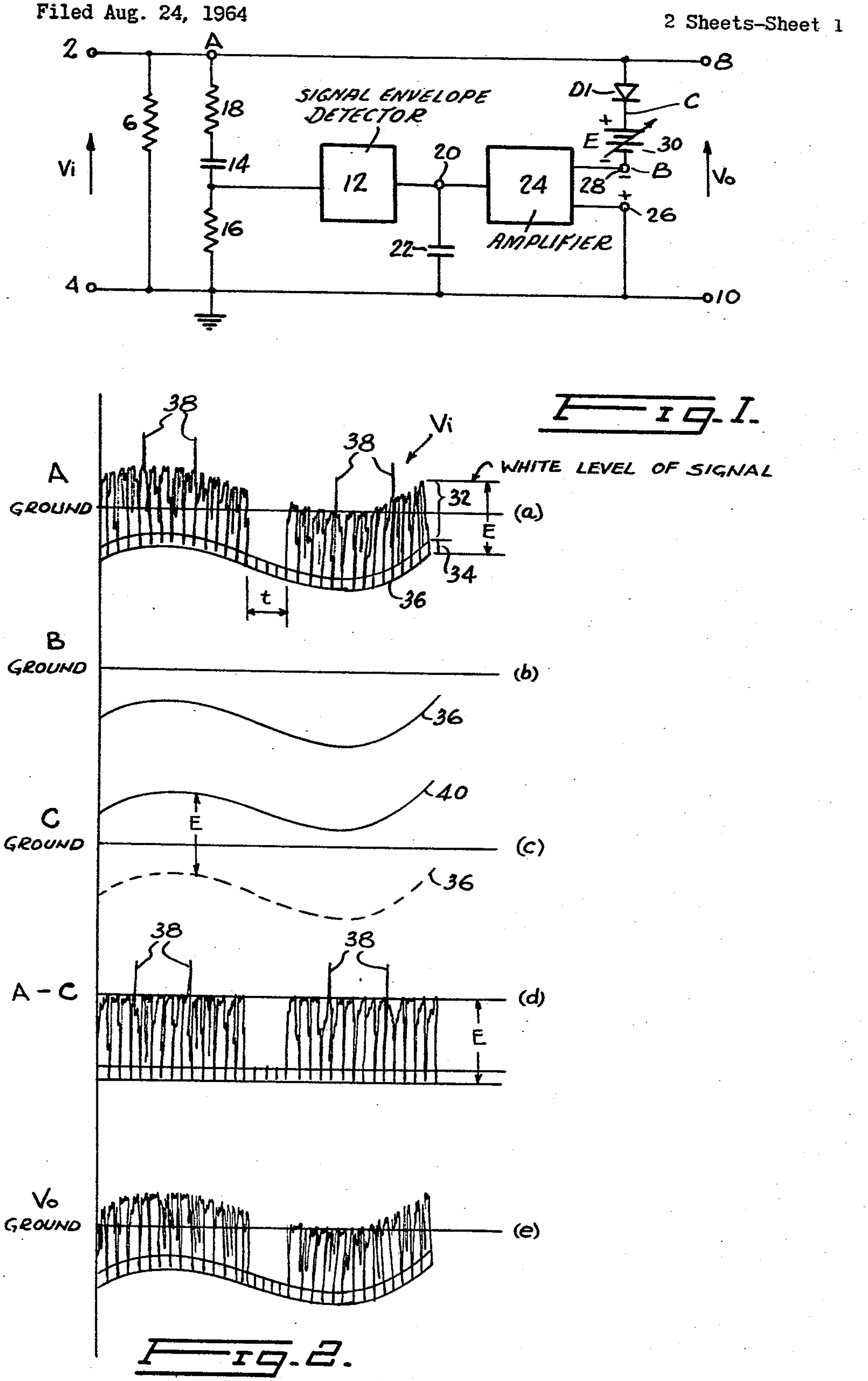
FIGURE 1 is a circuit diagram, partly in block form for a first circuit according to the invention.
FIGURE 2 shows voltage waveforms for the circuit of FIGURE 1.

Referring now to FIGURE 1, there is shown a first circuit, according to the invention. An input signal $V_i$, assumed for purposes of description to be an AC coupled, positive going, negative sync, video signal is applied to input terminals 2 and 4, across which is connected a resistor 6. Terminal 4 may be assumed to be grounded for purposes of the present discussion. An output terminal 8 is connected to input terminal 2, the path between terminals 2 and 8 thus constituting a signal transmission path 2–8. Another output terminal 10 is connected to input terminal 4, the path between these terminals thus constituting a signal transmission path 4–10. Output signal $V_o$ is taken from output terminals 8 and 10.

A conventional negative envelope detector 12 is coupled to signal transmission path 2–8 through coupling capacitor 14 and resistor 16 connected in series between paths 2–8 and 4–10. An additional resistor 18 may be added between capacitor 14 and path 2–8 to protect the video frequency response of path 2–8.

Envelope detector 12 is provided with an output terminal 20 to which is connected one end of an integrating capacitor 22, the other end of capacitor 22 being connected to path 4–10. Terminal 20 also constitutes the input terminal for a DC amplifier 24 having a large current gain but a voltage gain of unity, assuming that the efficiency of detector 12 is 100 percent, as will later be explained in more detail.

One output terminal 26 of amplifier 24 is connected to signal transmission path 4–10, while the other output terminal 28 is connected to the negative terminal of a variable DC source 30. The voltage E at source 30 is preset to be equal to the maximum peak to peak excursion desired for the output signal $V_o$. For purposes of the present discussion it is assumed that the maximum peak to peak excursion desired is from the negative tips of the negative sync pulses to the white level of the signal, and voltage E is set to equal this excursion; however any other clipping level may be selected (either above or below the white level) by adjustment of voltage E.

The positive terminal of source 30 is connected to the cathode of a clipping diode D1, the anode of the diode being connected to signal transmission path 2–8. A, B and C are reference points.

The operation of the FIGURE 1 circuit is best understood with reference to the waveform plots of FIGURE 2. Referring first to FIGURE 2(*a*) there is shown a typical AC coupled, positive going, negative sync, video input signal V*i* at point A as it would exist in the absence of clipping. Signal V*i* has a picture information portion 32, a synchronizing portion 34, and a negative envelope 36. Time interval *t* denotes a vertical blanking period during which no picture signal is present. Positive spikes 38 are shown in the input signal.

The waveform with respect to ground (terminal 4 being assumed grounded) at point B is shown in FIGURE 2(*b*). This waveform is simply the negative envelope 36 of input signal V*i*. In order for the waveform at point B to correspond accurately in amplitude to the negative envelope of signal V*i*, the DC amplifier 24 should make up for any loss in amplitude caused by negative envelope detector 12, e.g., if detector 12 is 100 percent efficient in detecting the negative envelope, then the voltage gain of amplifier 24 will be unity. If detector 12 is only, e.g., 50 percent efficient, amplifier 24 will have a voltage gain of two.

The waveform with respect to ground at point C is shown as 40 in FIGURE 2(*c*). This waveform is simply the negative envelope 36 at point B, having added thereto the preset voltage E.

The voltage difference between points A and C is the voltage operating on diode D1. This voltage difference is shown in FIGURE 2(*d*). Whenever this voltage difference tries to go positive, as for example when positive spikes 38 occur (at which time point A tries to go positive with respect to point C) diode D1 becomes forward biased to shunt these voltage spikes between signal transmission paths 2–8 and 4–10. Since the shunt circuit includes not only diode D1 but also source 30 and DC amplifier 24, the impedance of these latter two elements should be low, so that a sizeable signal current may be passed through them without a large potential drop. The final, clipped output signal V*o* is shown in FIGURE 2(*e*).

In practice it may be found that a slight tilt occurs in the negative envelope 36, as detected and supplied at point B, during vertical blanking periods. The reason for the tilt is that during vertical blanking intervals no picture signal is present and the charge on capacitor 22 varies accordingly. This tilt, which constitutes distortion, may be limited to a small value by choice of a suitably large value for capacitor 22.

Figure 3:
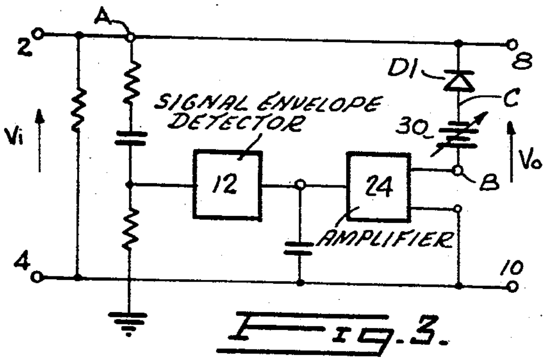
FIGURE 3 shows a modification of the circuit of FIGURE 1.

If the input signal is, for example, a negative going, positive sync signal, then the spikes to be clipped will appear on the negative side of the signal, instead of the positive side as just described. In that case, the polarities of the FIGURE 1 circuit will simply be reversed, as shown in FIGURE 3. Detector 12 is now a positive envelope detector and the polarities of source 30 and diode D1 are reversed. In this arrangement the positive envelope of the input signal is detected, from this envelope the selected voltage E is subtracted, and the resultant voltage is applied to the anode of diode D1. The input signal V*i* appears at point A, as before, i.e., at the cathode of diode D1. When the voltage at point A begins to go negative with respect to the voltage at point C, as when negative spikes occur, diode D1 becomes forward biased to clip such spikes.

It may be noted that whether the positive or the negative envelope is being detected, the envelope voltage and the preset voltage E are placed in opposition. For this reason it will be seen that in the circuits of FIGURES 1 and 3, the algebraic sum of the envelope voltage and the preset voltage E is taken, such summed voltage then being applied to one terminal of clipping diode D1.

In the foregoing description a shunt type clipping circuit has been described. However the invention is equally applicable to a series type clipping circuit, such as that shown in FIGURE 4. This circuit is similar to that of FIGURE 1 except that a clipping diode D2 is placed in signal transmission path 2–8 instead of being placed in shunt between the signal transmission paths. Assuming a positive going, negative sync input signal, the cathode of diode D2 is connected to terminal 2 and the anode of diode D2 is connected to terminal 8. A diode load resistor 42 is connected between output terminal 8 and the variable source 30.

Figure 4:
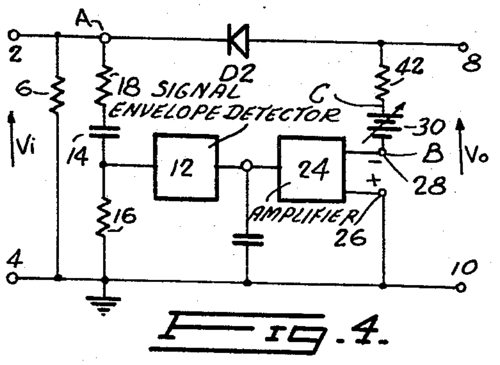
FIGURE 4 is a circuit diagram, partly in block form, for another circuit according to the invention.

The operation of the FIGURE 4 circuit is similar to that of the circuits previously described. With the positive going negative sync signal input as mentioned, the input signal will be that shown in FIGURE 2(*a*). The waveforms with respect to ground (terminal 4 being assumed grounded as before) at points B and C in FIGURE 4 will be as shown in FIGURES 2(*b*) and 2(*c*) respectively. The voltage at point A with respect to point C is as shown in FIGURE 2(*d*) and when this voltage begins to go positive (as when positive spikes above the white level occur), diode D2 becomes reverse biased and blocks flow of current between terminals 2 and 8. During the time when diode D2 is reverse biased, the output voltage V*o* between output terminals 8 and 10 is held at a voltage equal to the algebraic sum of the negative envelope voltage 36 and the preset voltage E, i.e., the output voltage follows waveform 40 during this time.

Figure 5:
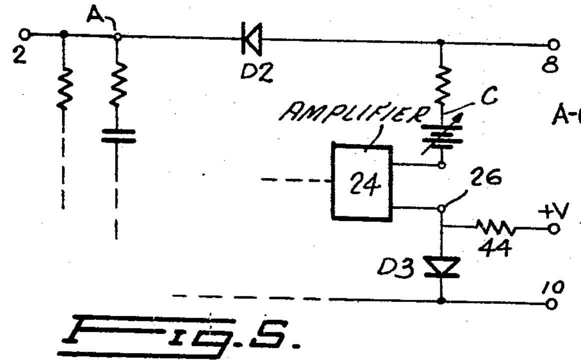
FIGURE 5 shows a modification of the circuit of FIGURE 4.
Figure 6:
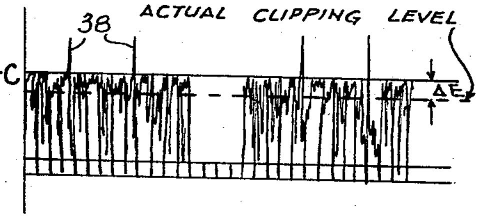
FIGURE 6 shows a voltage waveform for the circuit of FIGURE 5.

The FIGURE 4 circuit may be modified, as shown in FIGURE 5, to insert a diode D3 similar to diode D2 between output terminal 26 of amplifier 24 and signal transmission path 4–10. Diode D3, which is biased through resistor 44 connected to a source of positive potential +V, compensates for the work function of diode D2. When input signal V*i* becomes increasingly positive, diode D2, because of its work function, becomes reverse biased just before point A becomes positive with respect to point C, and thus diode D2 clips slightly too soon, at a lower peak to peak swing of signal V*i* then preset voltage E was adjusted to permit. The actual clipping level is shown in FIGURE 6, at a voltage ΔE below the zero level of the voltage difference between points A and C. Diode D3 adds in effect a voltage ΔE to the preset voltage E to compensate for this effect. A similar modification may be made to the FIGURE 1 circuit except that the diode D3 would then be there inserted in reverse polarity to that used for diode D3 in the FIGURE 5 circuit and would be biased from a negative source of potential.

Figures 7, 8, 9:
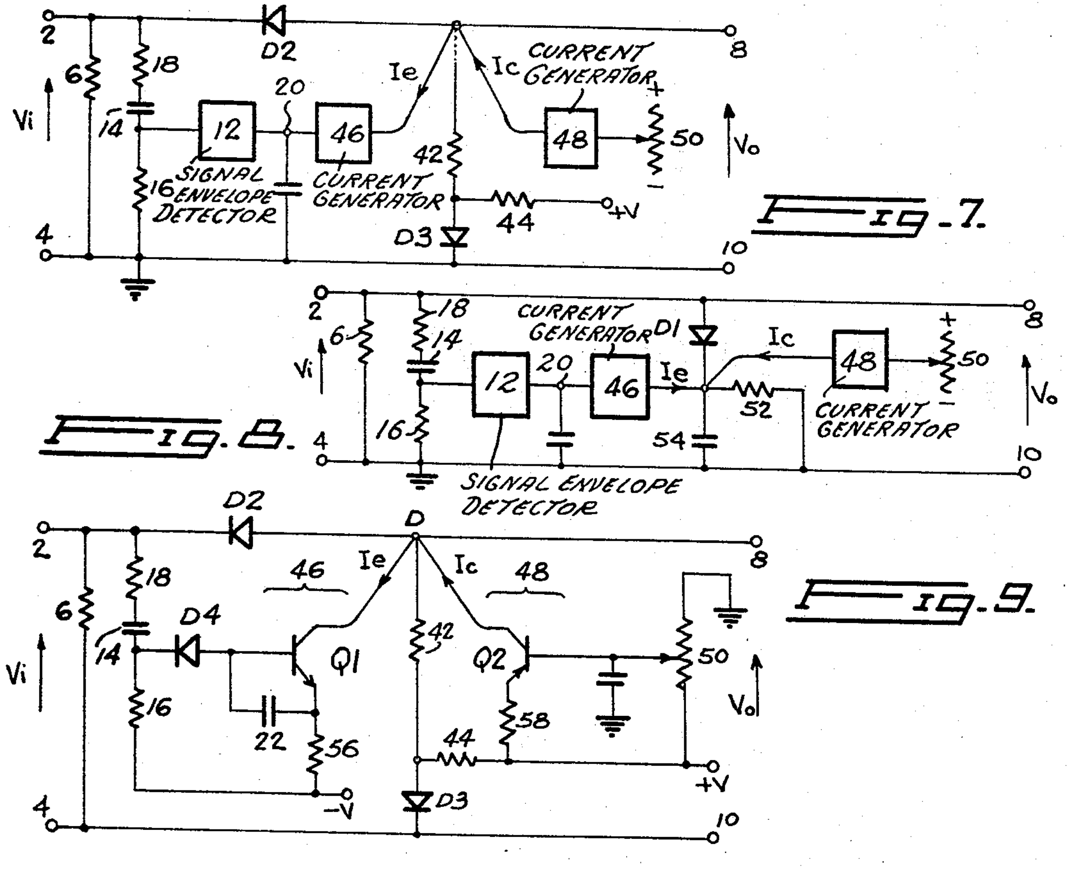
FIGURE 7 shows modification of the circuit of FIGURE 5.
FIGURE 8 shows a modification of the circuit of FIGURE 1.
FIGURE 9 is an illustrative circuit for the modification of FIGURE 7.

Next referring to FIGURE 7, there is shown a circuit similar to that of FIGURES 4 and 5 except that DC amplifier 24 has been replaced by a DC current generator 46 generating a current I*e* proportional to the negative envelope voltage applied to input terminal 20 of the generator. Source 30 has been replaced by another DC current generator 48 generating a current I*c* adjustable by a potentiometer 50 connected to the input of generator 48. Potentiometer 50 is used to set the clipping level desired. The output terminals of generators 46 and 48 are connected to the anode of diode D2. Diode load resistor 42 is, as before, connected at one end to the anode of diode D2, and its other end is connected through compensating diode D3 to signal transmission path 4–10.

In operation of the FIGURE 7 circuit, current generator 48 is adjusted (by means of potentiometer 50) to pass current I*c* through resistor 42. Current I*c* is sufficient to generate in resistor 42 a voltage equal to preset voltage E, i.e., a voltage equal to the desired peak to peak excursions of signal V*i*. Additionally, current generator 46 passes through resistor 42 a current I*e* sufficient to generate in the resistor a voltage corresponding to the negative envelope voltage of input signal V*i*. The two voltages add algebraically in resistor 42 to bias diode D2 just as in the FIGURES 4 and 5 circuits.

A similar current generator arrangement may be used in the shunt type circuit of FIGURE 1, such an arrangement being shown in FIGURE 8. Resistor 52 serves as the biasing resistor in which currents I*e* and I*c* add, and capacitor 54 provides a low impedance path to shunt video voltage spikes.

FIGURE 9 shows an illustrative circuit for the arrangement of FIGURE 7. Current generator 46 comprises an NPN transistor Q1 having its emitter connected through a resistor 56 to a source of negative potential −V and its collector connected to the anode of diode D1, hereinafter termed terminal D. The base of transistor Q1 is fed through a diode detector D4 connected to the junction between capacitor 14 and resistor 16, integrating capacitor 22 being connected between the base and emitter of transistor Q1. Transistor Q1 thus draws a current I*e* from terminal D proportional to the bias supplied at its base by diode detector D4.

Current generator 48 comprises a PNP transistor Q2 having its collector connected to terminal D and its emitter connected through biasing resistor 58 to a source of positive potential +V (which source also biases compensating diode D3 through resistor 44). The base of transistor Q2 is connected to potentiometer 50 which controls the current I*c* pumped into terminal D by transistor Q2.

For purposes of the foregoing description it has been assumed as previously mentioned that the peak to peak excursion desired for the signal has been the excursion from the negative sync pulses to the white level of the signal. However any other clipping level may be selected, by adjustment of source 30, so that the signal may be clipped above or below the white level as desired. In addition, the description has for illustrative purposes assumed the use of the invention as a white clipper, to operate on the picture information portion of the video signal, but circuits according to the invention may also be used as so called black clippers, to remove all or part of the synchronizing information from the signal. In such use, with for example, a positive going negative sync signal, (as shown in FIGURE 2*a*) the envelope detector 12 would detect the positive envelope of the signal and from this positive envelope voltage the preset voltage E (adjusted for example to the voltage difference between the white level and the black level of a standard television signal) would be subtracted, the resulting voltage being used to bias the clipping diode D1 or D2. Where such circuits are being used as black clippers, it may be desirable to remove any positive spikes first by preceding the black clipper by a white clipper, in order that detector 12 be able to detect a proper positive envelope for the signal.

It should further be noted that use of circuits according to the invention is not limited to the television field; such circuits may be used in other applications, such for example as in ordinary radio circuits.

The term "diode" as used in this description is meant to include any unidirectional device which, when in one bias condition, will block the flow of current, and when in another bias condition will pass current with a low voltage drop.

I claim:

1. A clipping circuit for removing portions of an electrical signal that exceed a selected value with respect to a varying reference voltage inherent in said signal while retaining all other portions of said signal, said circuit comprising:

(a) input means for said signal,
(b) output means coupled to said input means by a signal transmission path,
(c) diode means coupled to said input means for disabling said signal transmission path between said input means and said output means under one bias condition and for enabling said signal transmission path under another bias condition,
(d) means for generating a first voltage of said selected value independent of said signal, including means applying said first voltage to said diode means to bias the same to said other bias condition thus normally to enable said signal transmission path,
(e) means for generating a second voltage equals to said varying reference voltage,
(f) and means connecting together said means (d) and said means (e) for generating a third voltage equal to the algebraic sum of said first and second voltages,
(g) said means applying said first voltage to said diode means including means coupling said means (f) to said diode means to bias said diode means with said third voltage to disable said signal transmission path only when said third voltage assumes a polarity opposite to that of said first voltage whereby momentarily to disable said signal transmission path.

2. A circuit as claimed in claim 1 wherein said means (e) includes signal envelope detector means coupled to said input means.

3. A circuit as claimed in claim 2 wherein said means (e) further includes direct current amplifier means coupled to said envelope detector means, and said means (f) comprises a series connection of said direct current amplifier means and said means (d).

4. A circuit as claimed in claim 2 wherein said means (e) further includes first current generator means coupled to said envelope detector means, and said means (d) includes second current generator means, and said means (f) includes resistance means and means coupling both said current generator means to said resistance means for currents generated by said current generator means to add algebraically in said resistance means.

5. A clipping circuit for removing portions of an electrical signal that exceed a selected value with respect to a varying envelope voltage of said signal while retaining all other portions of said signal, said circuit comprising (a) input means for said signal,
(b) output means,
(c) a pair of signal transmission paths coupled between said input means and said output means,
(d) diode means in one of said signal transmission paths and having one terminal coupled to said input means and a second terminal coupled to said output means, said diode means being reversed biased under one bias condition to disable said one signal transmission path and being forward biased under another bias condition to enable said one signal transmission path,
(e) means for generating a first voltage of said selected value independent of said signal, including means applying said first voltage to said diode means to bias the same to said other bias condition thus normally to enable said one signal transmission path,
(f) means for generating a second voltage equal to said varying envelope voltage,
(g) and means connecting together said means (e) and said means (f) for generating a third voltage equal to the algebraic sum of said first and second voltages,
(h) said means applying said first voltage to said diode means including means coupling said means (g) to said second terminal of said diode means to bias said diode means with said third voltage to disable said one signal transmission path only when said third voltage assumes a polarity opposite to that of said first voltage whereby momentarily to disable said one signal transmission path, whereby, during intervals when said portions of said signal exceed said selected value with respect to said envelope voltage, said one signal transmission path is disabled.

6. A circuit as claimed in claim 5 wherein (j) said means (f) includes signal envelope detector means coupled to said input means, and direct current amplifier means coupled to said signal envelope detector means, and
(k) said means (g) comprises a series connection of said direct current amplifier means, said means (e), and resistance means.

7. A circuit as claimed in claim 5 wherein (j) said means (f) includes signal envelope detector means coupled to said input means, and first current generator means coupled to said signal envelope detector means for generating a first current dependent upon said signal envelope, (k) said means (e) comprises second current generator means for generating a second current, and (l) said means (g) comprises resistance means and means coupling both said current generator means to said resistance means, said first current generating in said resistance means a voltage equal to said signal envelope and said second current generating in said resistance means a voltage of said selected value, said voltages adding algebraically in said resistance means.

8. A clipping circuit for removing portions of an electrical signal that exceed a selected value with respect to a varying envelope voltage of said signal while retaining all other portions of said signal, said circuit comprising (a) input means for said signal, (b) output means, (c) a pair of signal transmission paths coupled between said input means and said output means, (d) diode means coupled between said signal transmission paths, said diode means being forward biased under one bias condition to disable signal transmission between said input and said output means and being reversed biased under another bias condition to enable said signal transmission, (e) means for generating a first voltage of said selected value independent of said signal, including means applying said first voltage to said diode means to bias the same to said other bias condition thus normally to enable said signal transmission between said input and output means, (f) means for generating a second voltage equal to said varying envelope voltage, (g) and means connecting together said means (e) and said means (f) for generating a third voltage equal to the algebraic sum of said first and second voltages, (h) said means applying said first voltage to said diode means including means connecting said means (g) to said diode means to bias said diode means with said third voltage to disable said signal transmission between said input and output means only when said third voltage assumes a polarity opposite to that of said first voltage whereby momentarily to disable said signal transmission, whereby, during intervals when said portions of said signal exceed said selected value with respect to said envelope voltage, said one bias condition is established to disable said signal transmission.

9. A circuit as claimed in claim 8 wherein (j) said means (f) includes signal envelope detector means coupled to said input means, and direct current amplifier means coupled to said signal envelope detector means, and (k) said means (g) comprises a series connection of said direct current amplifier means and said means (e), said series connection and said diode means being coupled in series between said signal transmission paths.

10. A circuit as claimed in claim 8 wherein (j) said means (f) includes a signal envelope detector means coupled to said input means, and first current generator means coupled to said signal envelope detector means for generating a first current dependent upon said signal envelope, (k) said means (e) comprises second current generator means for generating a second current, and (l) said means (g) comprises resistance means and means coupling both said current generator means to said resistance means, said first current generating in said resistance means a voltage equal to said signal envelope and said second current generating in said resistance means a voltage of said selected value, said voltages adding algebraically in said resistance means, said resistance means and said diode means being coupled in series between said signal transmission paths.

References Cited

UNITED STATES PATENTS

| | | | |
|---|---|---|---|
| 2,277,040 | 3/1942 | Dome | 328—165 |
| 3,213,372 | 10/1965 | Kurvits | 325—478 |

ARTHUR GAUSS, *Primary Examiner.*

B. P. DAVIS, *Assistant Examiner.*